(No Model.)
C. A. SCHOESSEL.
SAW SWAGING DEVICE.
No. 381,851. Patented Apr. 24, 1888.
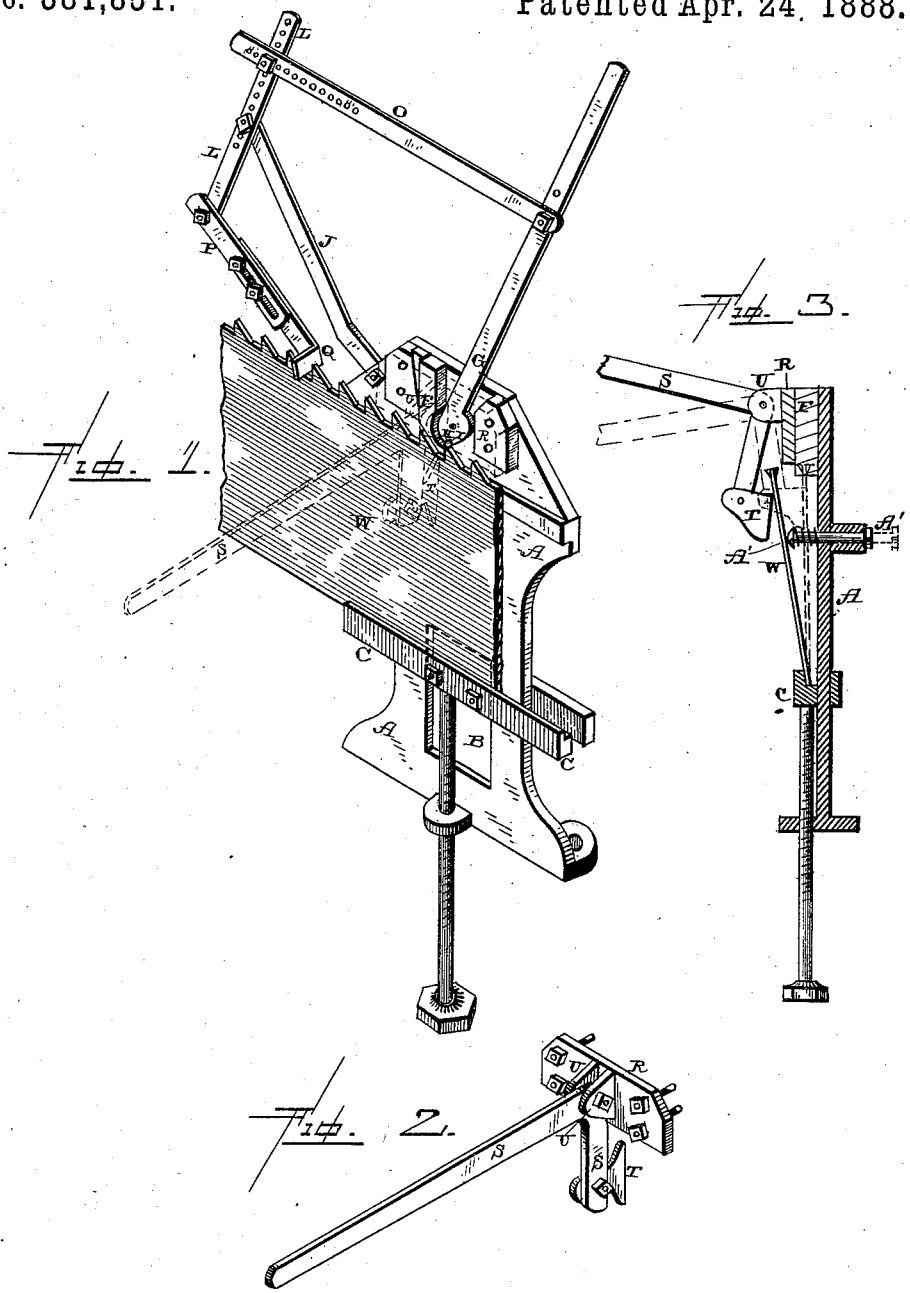

UNITED STATES PATENT OFFICE.

CHRISTIAN AUGUST SCHOESSEL, OF ROCK ISLAND, ILLINOIS.

SAW-SWAGING DEVICE.

SPECIFICATION forming part of Letters Patent No. 381,851, dated April 24, 1888.

Application filed November 15, 1887. Serial No. 255,223. (No model.)

*To all whom it may concern:*

Be it known that I, CHRISTIAN AUGUST SCHOESSEL, of Rock Island, in the county of Rock Island and State of Illinois, have invented certain new and useful Improvements in Saw-Swages; and I do hereby declare the following to be a full, clear, and exact description of the invention, such as will enable others skilled in the art to which it pertains to make and use it, reference being had to the accompanying drawings, which form part of this specification.

My invention relates to an improvement in saw-swages; and it consists in, first, the combination of a suitable frame-work for supporting the saw while being operated upon, a pivoted lever provided with a recess, in which is placed a roller which swages the tooth, the die, and a mechanism for moving the saw endwise, and thus presenting new teeth to be operated upon; second, the combination of the swaging-lever with a clamping-lever for holding the saw rigidly while its teeth are being swaged, as will be more fully described hereinafter.

The objects of my invention are to provide a swage for swaging the teeth for band and gang saws, and in which the saw is fed forward by the movement of the lever which does the swaging, and to hold the saw rigidly while being acted upon.

Figure 1 is a perspective of a machine which embodies my invention. Fig. 2 is a detail view. Fig. 3 is a vertical section taken at right angles through Fig. 1 and at one side of the lever S.

A represents a suitable frame-work of any desired shape, size, or construction, and which has the opening B made through it, so as to allow the support C for the saw to be adjusted vertically, in order to accommodate itself to the width of the saw being swaged. Secured to the upper portion of the frame A is the die F, of suitable shape, and pivoted to one side of this die is the operating-lever G, which has a recess, H, in its lower end, and in which recess is placed the hardened-steel roller I. When the upper end of this lever G is moved toward the right, the roller I is forced down upon and against the point of the tooth, so as to spread it. This roller I revolves freely in the recess H, and thus lessens the friction as much as possible.

Extending outward from the frame A is an arm, J, and pivoted upon this arm is a lever, L, which is provided with a series of holes, as shown. Connecting the levers G and L together is a connecting-rod, O, which is also provided with a series of holes. Pivoted to the lower end of the lever L is the arm P, which is slotted, and to which is adjustably secured the foot Q. This foot can be adjusted back and forth upon the arm P, so as to adjust it to the size of the teeth on the saw. The connecting-rod O and the lever L are provided each with a series of holes, so that the adjustment of the different parts can be changed at will, and thus regulate the distance the saw is to be moved. When the lever G is moved toward the right, the tooth of the saw which is bearing against the die F is swaged, and when the lever G is moved toward the left at its upper end the connecting-rod O, lever L, arm P, and foot Q are all correspondingly moved, so as to force the saw along, and thus present a new tooth to the action of the roller and lever G. By the adjustment of the different parts the saw is moved just the proper distance to bring a new tooth into position to be operated upon.

For the purpose of rigidly clamping the saw while its teeth are being swaged, there is pivoted to the cover R an L-shaped lever, S, which carries a foot bearing or clamp, T, upon its shorter end. This lever S is pivoted between the ears U on the cover R, which is applied to the side of the frame, as shown, and which cover serves as one of the bearings for the operating-lever G, to prevent the roller I from becoming displaced and to serve as a support for the lever S. The levers S and G are both operated at the same time. When the lever G is to be moved toward the right to swage a tooth, the outer end of the lever S is depressed, so that the foot or clamp T will bear against the side of the saw W, and thus hold it rigidly in position, so that it can have no movement whatever. This clamp is absolutely necessary to enable good work to be performed.

Passing through the side of the frame A, and bearing against the inner side of the saw W, is a spring-actuated screw-rod, A', for the purpose of forcing the saw laterally when the lever S and clamp T are moved into the position shown in solid lines in Fig. 3. As soon as the upper edge of the saw is left free to move laterally the spring-actuated rod A' forces its upper edge just far enough to one side beyond the anvil to allow the saw to be fed forward, so as to present a new tooth to be acted upon. As soon as the outer end of the lever S is depressed, the saw is moved into the position shown in dotted lines in Fig. 3, so that one of its teeth will again bear against the anvil, as shown in Fig. 1.

Having thus described my invention, I claim—

1. In a saw-swage, the combination of the frame A, the adjustable support C for the saw, the die secured to the upper part of the frame, the pivoted lever G, carrying the roller I, the connecting rod O, lever L, the foot Q, operated thereby, and the arm J, extending out from the frame, substantially as shown and described.

2. The combination of the frame upon which the saw is supported, the lever G, provided with a roller in its end, and the die, with a pivoted lever and a clamp for clamping the saw while one of its teeth is being swaged, substantially as set forth.

3. In a swage, the combination of a frame for supporting the saw, the die, a lever for swaging the teeth, a lever for moving the saw forward, and which is operated by the swaging-lever, and a lever and clamp for clamping the saw while the tooth is being swaged, the clamp and lever being made to extend at right angles to the operating-lever and saw, so as to force the clamp against the side of the saw, substantially as specified.

4. The combination of the frame for supporting the saw, the die, the lever for swaging the saw, a lever for moving the saw forward, and which is operated through suitable connecting-rods by the operating-lever, the lever S, provided with a clamp, T, and projecting from the frame at right angles to the saw, and the spring-actuated rod which moves the upper edge of the saw laterally when it is left free to move by the clamp, substantially as shown.

In testimony whereof I affix my signature in presence of two witnesses.

CHRISTIAN AUGUST SCHOESSEL.

Witnesses:
JOHN P. WEYERHAEUSER,
ROBERT R. LINN.